United States Patent
Zhang et al.

(10) Patent No.: US 10,144,269 B2
(45) Date of Patent: Dec. 4, 2018

(54) DUAL LINE REGISTER

(71) Applicant: FORD GLOBAL TECHNOLOGIES, LLC, Dearborn, MI (US)

(72) Inventors: Yahong Zhang, Canton, MI (US); Craig R. Wetzel, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 454 days.

(21) Appl. No.: 14/925,136

(22) Filed: Oct. 28, 2015

(65) Prior Publication Data

US 2017/0120721 A1  May 4, 2017

(51) Int. Cl.
 *B60H 1/00* (2006.01)
 *B60H 1/34* (2006.01)

(52) U.S. Cl.
 CPC ....... *B60H 1/00685* (2013.01); *B60H 1/0065* (2013.01); *B60H 1/345* (2013.01); *B60H 1/3421* (2013.01); *B60H 2001/00707* (2013.01); *B60H 2001/3471* (2013.01)

(58) Field of Classification Search
 USPC .......................... 454/155, 162; 251/302, 250
 See application file for complete search history.

(56) References Cited

U.S. PATENT DOCUMENTS

| | | | | |
|---|---|---|---|---|
| 1,607,092 A | * | 11/1926 | Hand | F24F 13/06 454/284 |
| 3,861,281 A | * | 1/1975 | Godwin | B60H 1/3428 454/155 |
| 4,610,196 A | * | 9/1986 | Kern | B60H 1/3435 454/127 |
| 4,664,022 A | * | 5/1987 | Oddenino | B60H 1/3414 454/155 |
| 4,887,520 A | * | 12/1989 | Bauer | B60H 1/0065 454/155 |
| 5,176,567 A | * | 1/1993 | Piritore | B60H 1/3428 454/155 |
| 5,188,561 A | * | 2/1993 | Nissimoff | F24F 11/00 454/256 |
| 5,232,403 A | * | 8/1993 | Marotta | F24F 13/081 454/289 |
| 5,397,267 A | * | 3/1995 | Vecellio | B60H 1/3428 454/155 |
| 5,588,910 A | | 12/1996 | Hutter et al. | |
| 5,697,841 A | * | 12/1997 | Di Giovine | F24F 3/065 454/286 |
| 5,733,189 A | | 3/1998 | Eastwood | |
| 5,820,457 A | * | 10/1998 | Kern | B60H 1/3428 454/315 |

(Continued)

FOREIGN PATENT DOCUMENTS

| | | | |
|---|---|---|---|
| CN | 103791601 A | 5/2014 | |
| DE | 4016026 A1 | * 11/1991 | ........... B60H 1/3421 |

(Continued)

*Primary Examiner* — Gregory Huson
*Assistant Examiner* — Frances F Hamilton
(74) *Attorney, Agent, or Firm* — Vichit Chea; MacMillan, Sobanski & Todd, LLC

(57) ABSTRACT

An automobile air vent register is described. The register uses a pair of rotating vent cover doors and an elongate opening in a configuration providing good airflow control within a limited space. Exemplary methods and structures for controlling and directing airflow are provided.

20 Claims, 7 Drawing Sheets

(56) References Cited

U.S. PATENT DOCUMENTS

| | | | | |
|---|---|---|---|---|
| 5,947,813 A * | 9/1999 | Chow | ............... | B60H 1/3435 |
| | | | | 454/155 |
| 5,967,891 A | 10/1999 | Riley et al. | | |
| 6,048,263 A | 4/2000 | Uchida et al. | | |
| 6,146,265 A | 11/2000 | Greenwald | | |
| 6,224,480 B1 | 5/2001 | Le et al. | | |
| 6,394,891 B1 * | 5/2002 | Arold | ............... | B60H 1/3414 |
| | | | | 454/155 |
| 6,554,696 B2 | 4/2003 | Kowalski et al. | | |
| 6,695,691 B1 | 2/2004 | Le | | |
| 6,739,969 B2 * | 5/2004 | Shin | ............... | B60H 1/3421 |
| | | | | 454/155 |
| 6,939,969 B2 | 9/2005 | Peters et al. | | |
| 6,974,377 B2 * | 12/2005 | Gehring | ............... | B60H 1/3414 |
| | | | | 454/152 |
| 7,029,390 B2 | 4/2006 | Karadia | | |
| 8,166,775 B2 | 5/2012 | Choi | | |
| 8,480,461 B2 * | 7/2013 | Gruenberg | ......... | B60H 1/00564 |
| | | | | 138/39 |
| 9,950,592 B2 * | 4/2018 | Zhang | ............... | B60H 1/3414 |
| 2002/0072321 A1 * | 6/2002 | Kowalski | ........... | B60H 1/00742 |
| | | | | 454/155 |
| 2004/0118276 A1 * | 6/2004 | Kim | ............... | B01D 46/0023 |
| | | | | 95/8 |
| 2006/0286919 A1 | 12/2006 | Han et al. | | |
| 2008/0119125 A1 * | 5/2008 | Guerreiro | ............... | B60H 1/345 |
| | | | | 454/75 |
| 2011/0072925 A1 * | 3/2011 | Ikeda | ............... | B60H 1/00664 |
| | | | | 74/412 R |
| 2013/0029582 A1 * | 1/2013 | Takai | ............... | F24F 13/075 |
| | | | | 454/284 |
| 2014/0302769 A1 * | 10/2014 | Sawada | ............... | B60H 1/3421 |
| | | | | 454/315 |
| 2014/0357178 A1 * | 12/2014 | Doll | ............... | F24F 13/072 |
| | | | | 454/284 |
| 2016/0052368 A1 * | 2/2016 | Zhang | ............... | B60H 1/3414 |
| | | | | 454/154 |
| 2016/0129762 A1 * | 5/2016 | Brinas | ............... | B60H 1/3428 |
| | | | | 454/155 |
| 2016/0152116 A1 * | 6/2016 | Albin | ............... | B60H 1/3421 |
| | | | | 454/155 |
| 2016/0250909 A1 * | 9/2016 | Schneider | ............... | B60H 1/3421 |
| | | | | 454/155 |

FOREIGN PATENT DOCUMENTS

| | | | | |
|---|---|---|---|---|
| DE | 19748998 C1 | | 10/1998 | |
| DE | 19739652 A1 | * | 3/1999 | ............ B60H 1/3435 |
| DE | 10340353 A1 | * | 3/2005 | ............ B60H 1/3421 |
| DE | 1 02004 01 31 | * | 6/2005 | ......... B60H 1/00685 |
| DE | 102009007037 | * | 8/2010 | ............ B60H 1/3421 |
| DE | 102010063334 A1 | | 6/2012 | |
| EP | 1577131 B1 | | 12/2006 | |
| EP | 2072297 B1 | | 7/2011 | |
| GB | 1296921 A | * | 11/1972 | ............ B60H 1/3421 |
| WO | 2012053824 A2 | | 4/2012 | |

* cited by examiner

DUAL LINE REGISTER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to air outlets, and more specifically to registers in automobile air conditioning systems.

Providing controlled airflow to people in automobiles is important in providing a comfortable driving experience. Directing the flow of air is a key factor in maintaining comfort.

Increasingly, modern vehicles have sophisticated displays, interactive navigational systems, entertainment systems, airbags, and other features competing for limited space in the vehicle, and in particular, on and around the instrument panel. Air vents are among the features generally provided on or around the instrument panel or dashboard. If air vents are too small or poorly configured, the air system may not provide flow where needed and may also cause unwanted noise, such as a whistling or hissing sound.

Accordingly, there is a need for air vents that provide good air flow and control using configurations that improve the use of limited space.

SUMMARY OF THE INVENTION

In one aspect of the invention, an apparatus is provided for a vehicle air register, comprising: an airflow path through an opening from a duct to a vehicle interior, the opening having a length and width, wherein the length is greater than the width; a first cover, wherein the first cover is semi-cylindrical and configured to rotate about 120 degrees between a closed position and an open position; and a second cover, wherein the second cover is semi-cylindrical and configured to rotate about 120 degrees between a closed position and an open position.

In some embodiments, the register has a cover control, wherein the cover control is configured to rotate the cover doors to a plurality of position settings, wherein the settings include fully closed, fully open, and a multiplicity of partly-open positions.

In some embodiments, the register has a plurality of vanes oriented substantially perpendicular to the length of the register, wherein the vanes are adapted to pivot, thereby directing air flow; and a vane control configured to pivot the vanes by a linear actuator. In some embodiments, the linear actuator is a rack and pinion system substantially enclosed within a compartment.

DETAILED DESCRIPTION OF PREFERRED EMBODIMENTS

Figure 1:
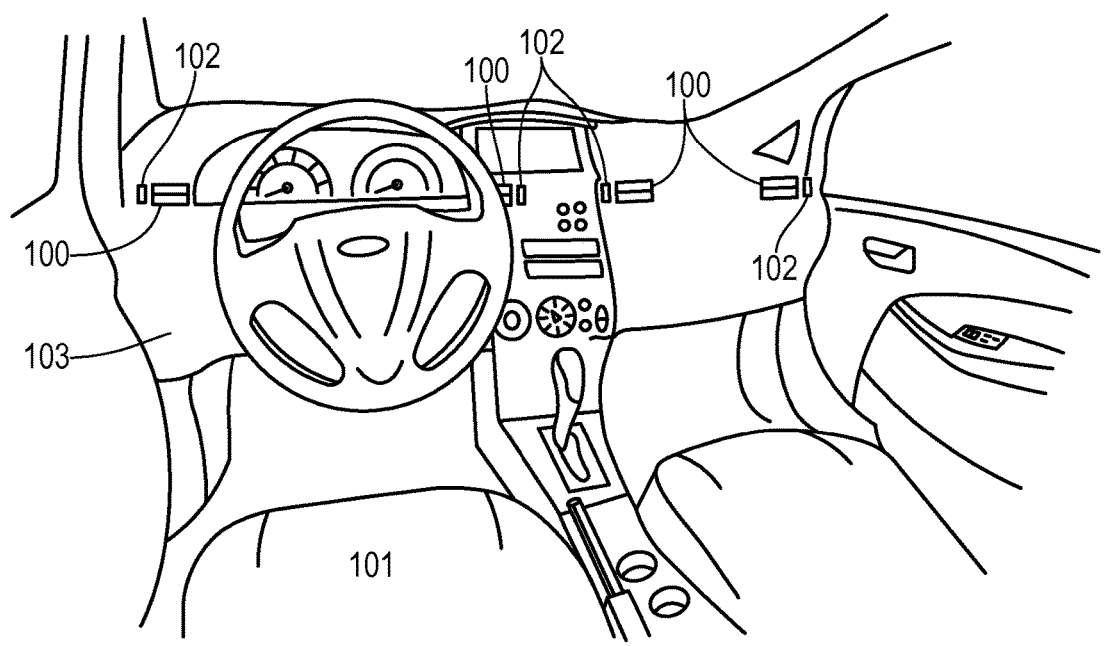
FIG. 1 is an image of a car interior showing example placements of air registers on the dashboard.

An automobile air vent register is described. The register provides good air flow control using configurations that improve the use of limited space. In particular, the register has positionable covers that deflect and direct the flow of air.

The register dimensions are elongate. In some embodiments, the register opening is rectangular, with the length measured parallel to a pivot axis and the width measured perpendicular to the pivot axis. As used herein, for a substantially rectangular opening, the length is longer than the width. In some embodiments, the length of the longer dimension of the opening is more than four times the width of the opening. In some embodiments, the length is approximately six times the width. In some embodiments the length is five to fifteen times the width. The effective flow area must be sufficiently sized to accommodate the flow volume, though the ratio of length to width can vary. The terms length and width are used relative to the opening, without limitation to the placement or orientation of the register in the automobile interior. Likewise, other positional terms, such as upper, lower, up, down, lateral, opposite, across, above, below, and the like, are intended only to describe relative position or placement.

The register may have a plurality of vanes oriented substantially perpendicular to the length of the register. In some embodiments, the register has a single set of vanes roughly perpendicular to the longer dimension of the register. The set of vanes may be movably mounted within a housing to direct air flow. The vanes pivot or rotate to change air flow direction. A rack and pinion system may be utilized to control the rotational angle of the vanes.

The dual line register eliminates the need for lateral vanes. Because the rotary cover doors, in fully or partly open positions, direct airflow transversely or orthogonally to the direction controlled by the vertical vanes, lateral vanes, parallel to the length of the opening, can be omitted. In some embodiments the vertical vanes may also be omitted. Reducing the number of vanes has the advantage of reducing turbulence and decreasing the sound produced by the airflow.

The dual line register eliminates the need for flow shutters. Because the rotary cover doors, in the fully closed position, block substantially all airflow through the register, a secondary structure, such as a flow shutter in the duct, can be omitted from the HVAC system of a vehicle. In some embodiments, blocking airflow is accomplished by a structure consisting essentially of the cover door system described, and no secondary structure.

The configuration of the open panel surface adjacent to the register can be shaped to utilize the Coanda effect. The Coanda (or Coandă) effect is the attraction of a fluid jet to flow along a nearby surface and follow its contour. This effect can be best utilized by orienting a surface alongside or at an angle to the air flow path. This surface may be referred to as an open surface panel. For example, a register placed on the instrument panel or dashboard can provide one or more air-directing surfaces as air flowing out of the register flows along a surface of the dashboard. As another example, a register can be positioned under and along an extruded long edge. The curved surface beneath that long edge can be used as its open surface panel. At low blower speeds, the Coanda effect can be particularly effective in directing airflow.

The register has a pair of covers or rotary doors mounted to the housing. The cover doors rotate, or pivot, to cover or partly cover the opening and the set of vanes, thereby blocking air flow. The doors can be open, closed, or partially open. In selected partially open positions, the covers may be adjusted to a desired angle to direct air flow. The positioning of the pair of rotary doors provides precise directional flow control. The interior surface of the cover doors, facing the airflow stream, may be further configured to channel air or to better utilize the Coanda effect in directing the air flow when a cover is in a partially open position.

The cover doors retract into compartments in or behind paneling. Each compartment is separated from the air flow path by a wall and by the cover partition so as to maintain a smooth air flow. The partition surface shape may be flat or curved. The shape of the partition influences the air flow. When the register is fully open both covers are rotated into the compartment areas on either side of the register, enclosing and concealing the semi-cylindrical surface of the covers from view. The semi-cylindrical cover rotates into the housing compartment. In an embodiment, each cover describes about 120 degrees of an arc of a circle. The exterior contour of the cover compartment may be visible from the car interior or may be hidden from view behind paneling. In an embodiment, each of the cover doors is semi-cylindrical on a surface facing the vehicle interior when closed.

In some embodiments the covers are positioned using a knob connected to one or more gears or linkages. In some embodiments the knob is pushed, pulled, rotated, moved laterally, and/or moved vertically, to rotate the cover doors to a desired position.

In an embodiment, the cover control is rod-like with a knob at the user interface end and a toothed gear or worm thread at the gear-engaging end. Twisting the knob or moving the knob up and down or from side to side, provides a force to turn one or more engaging gears. Pulling or pushing the knob selects which gears are engaged by meshing the teeth or thread of the controller with the teeth of one or more gears. Multiple gears can be used to transmit the force or to change the direction of the force. Turning the knob turns one or more gears which rotate the cover door around a pivot axis for each door. Embodiments select gear types suited to transmitting a user motion to rotate the covers.

In another embodiment, the cover control includes a dial or wheel. In other embodiments, the covers are positioned with tabs, ridges, indentations, or other surface detail on the cover surface and/or leading edge. In an additional embodiment, the cover control is implemented using at least one Bowden cable. In further embodiments, the cover control is implemented by at least one motorized controller. In an embodiment utilizing a motorized controller, the cover doors close automatically when the blower is off, preventing dust entry through the register.

Air ducts supply air from a blower to the register. The register directs air flow into the passenger compartment. In some embodiments, airflow is further modulated by a splitter. A splitter can be placed in to the duct to provide improved air distribution. The use of splitters is particularly useful when directing air flow through a register with dimensions that differ substantially from the duct dimensions, as with an elongate register. This difference might include, for example, a duct with a cross-section width and height of approximately 5-7 centimeters providing air to a register with a width of approximately 12-16 cm and a height of approximately 2-3 cm. While in both instances the effective area is roughly the same, the dimensions differ substantially. In addition to the use of splitters, changes in side-wall dimensions along the air flow path can be used to restrict and spread the flow of air through the duct.

In some embodiments, the register system further comprises at least two splitter fins placed along the airflow path between the duct and the opening. In some embodiments, the opening width is less than half of a width of the duct. In some embodiments, the opening length is at least three times the width. In some embodiments, the opening length is at least four times the width. In some embodiments, the opening length is at least five times the width. In some embodiments, the register opening width is between a tenth and a half of a width or diameter of the air-supplying duct. In some embodiments, the register opening width is between a tenth and a quarter of a width of the air-supplying duct.

Turning now to the figures, by way of example, FIG. 1 depicts a car interior 101 showing dual line registers 100 on panels 103 of the dashboard. As shown, the orientation of the register 100 can vary. Although shown vertically and horizontally, the register 100 can also be oriented diagonally and in panels 103 that protrude or are recessed. Placement may be selected based on design parameters and desired air flow. Controls 102 for each register 100 may be located adjacent the vent opening.

Figure 2:
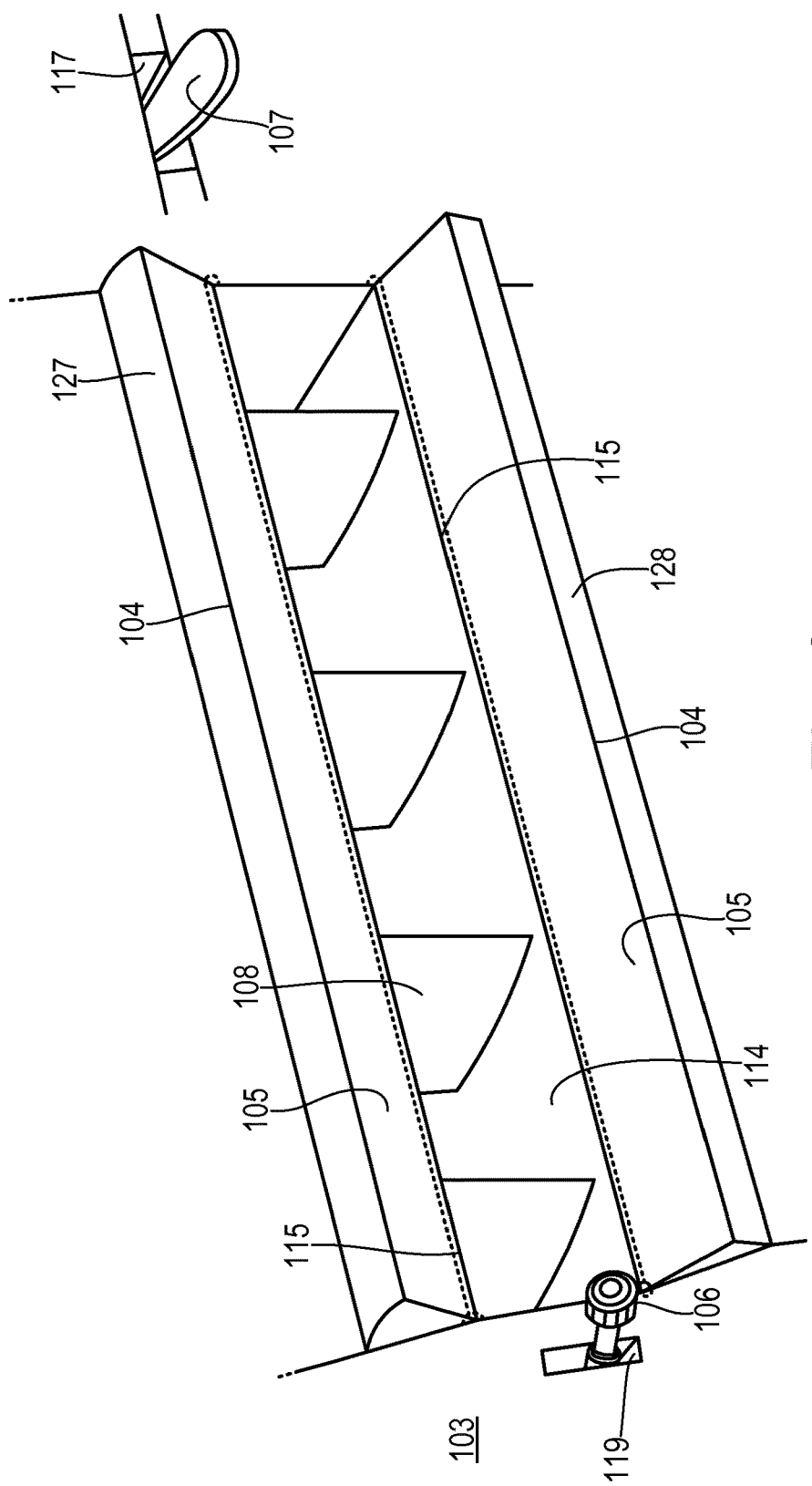
FIG. 2 is a front perspective image of a partly open register.
Figure 3:
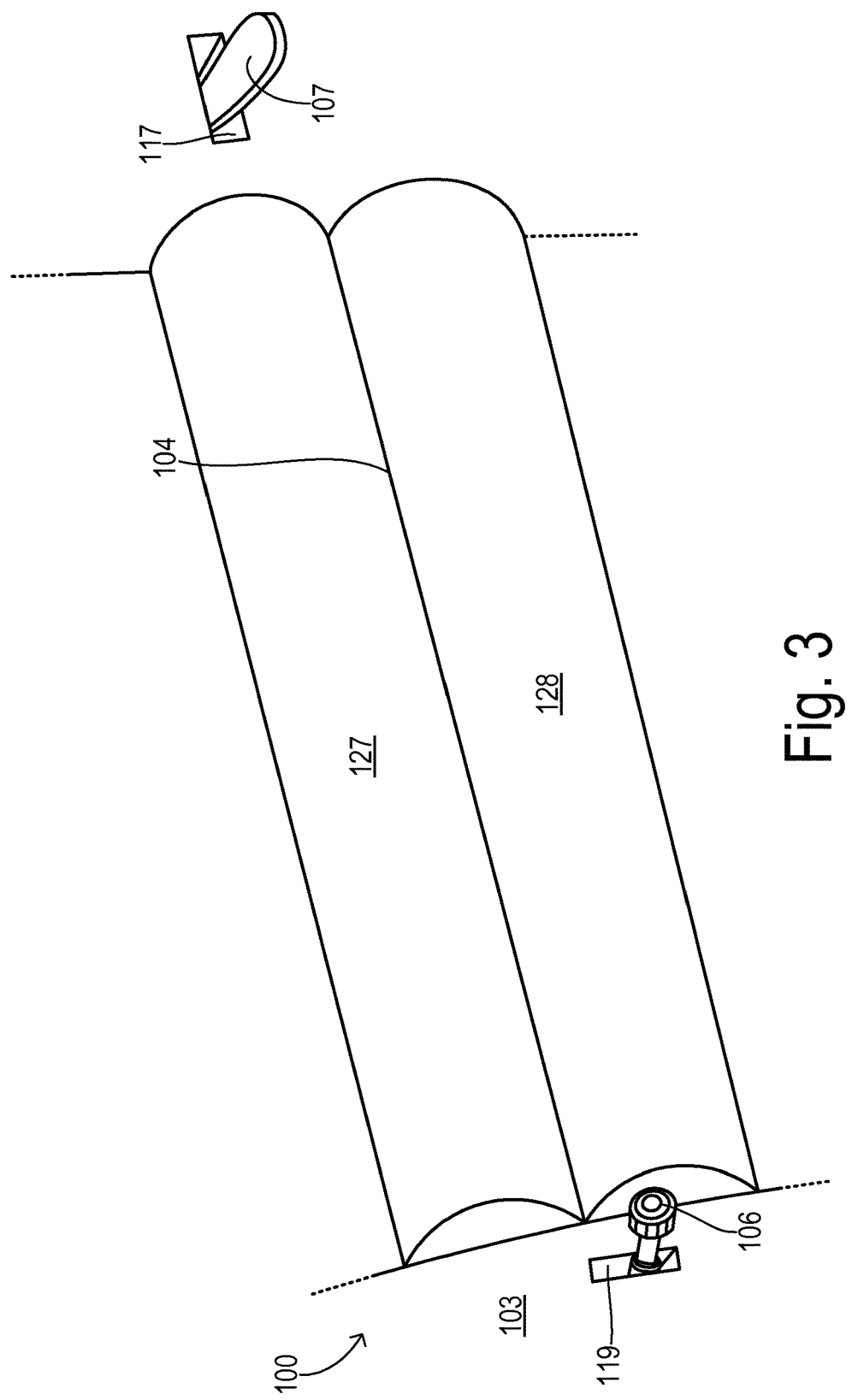
FIG. 3 is a front perspective image of a fully closed register.
Figure 4:
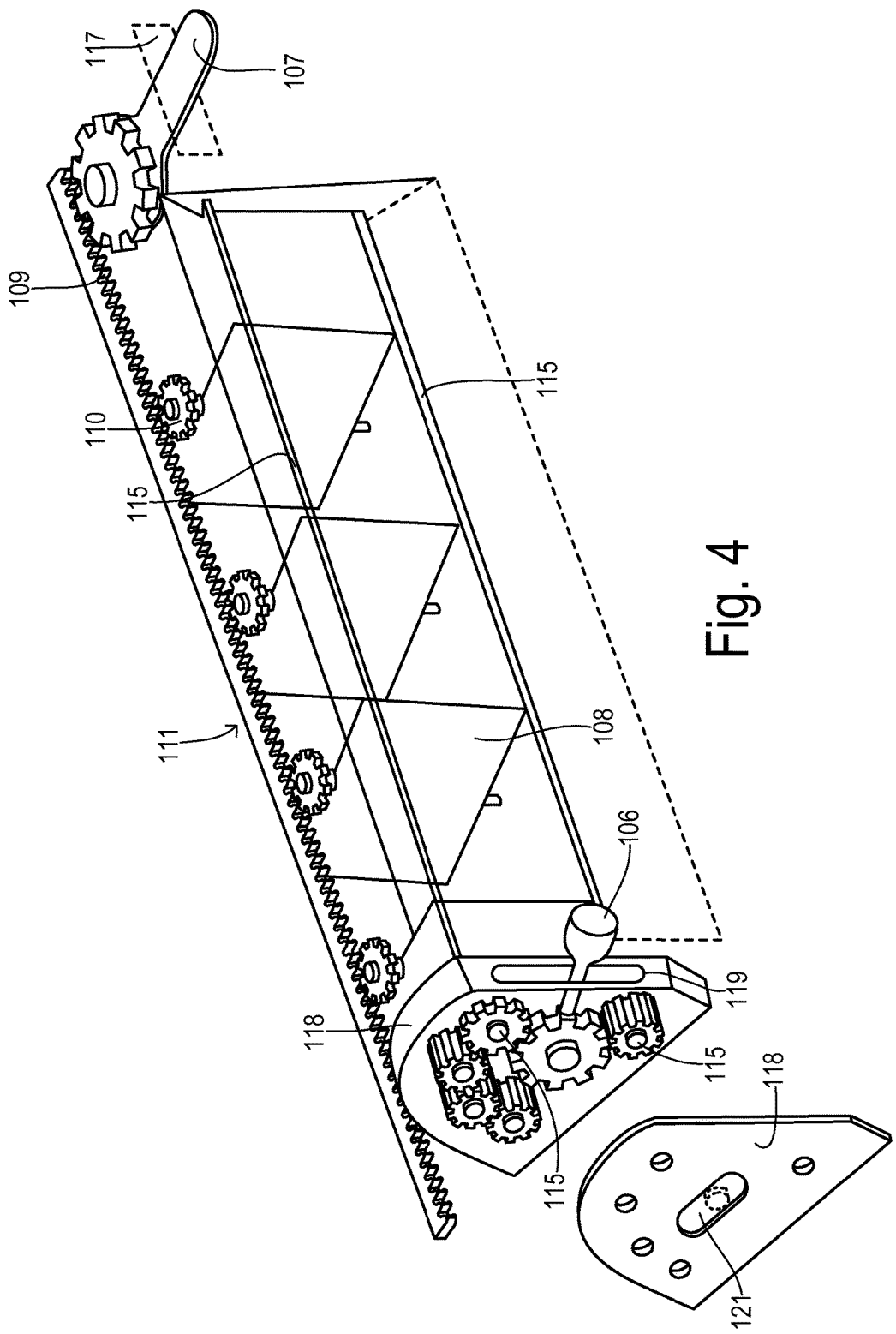
FIG. 4 is a front perspective cut away image of a register showing the interior cover housing and duct.

FIGS. 2-4 show a dual line register 100. The closed register 100 has a double parallel semi-cylindrical shape, convex towards the car interior 101, formed by a set of curved cover doors 127, 128. Airflow is directed side-to-side along the length by vanes 108 which can be angled by a vane control lever 107. In the embodiment shown in FIGS. 2-4 airflow controls 102 are provided by a lever 107, which uses a rack 109 and pinion 110 system to angle the vanes 108, and by a cover control knob 106 which positions cover doors 127, 128.

The cover doors 127, 128 can be partly open, as shown in FIG. 2, fully closed, as shown in FIG. 3, or fully open. When fully closed, the cover doors 127, 128 block airflow through the register 100. FIG. 4 provides a cut-away view showing a wall 114 separating the airflow area from compartments 111 on opposite sides of the register housing the cover doors 127, 128 when the vent is open. This compartment 111 can also house a linear actuator for controlling the angle of the vanes 108 as shown with the rack 109 and pinion 110 system. The instrument panel 103 has a linear actuator slot 117 through which the vane control lever 107 passes. The instrument panel 103 also has a cover control slot 119 for the cover control knob 106.

The cover control knob 106 is used in positioning the cover doors 127, 128 which are rotated about a turning axis 115. Each turning axis 115 for each of the two cover doors 127, 128 is parallel and runs along the length of the register 100 opening. The rotation about each axis 115 is controlled by gears in a gear enclosure 118. The gear enclosure 118 provides a gear engagement guide slot 121 on one or both side walls of the gear enclosure 118, to position a driving gear with respect to selected driven gears. The side wall of the gear enclosure 118 may also provide securing features, such as holes or notches, for the driven gears. The cover control knob 106 can be used to selectively engage gears as discussed in more detail below with regard to FIGS. 10-11.

Figure 5:
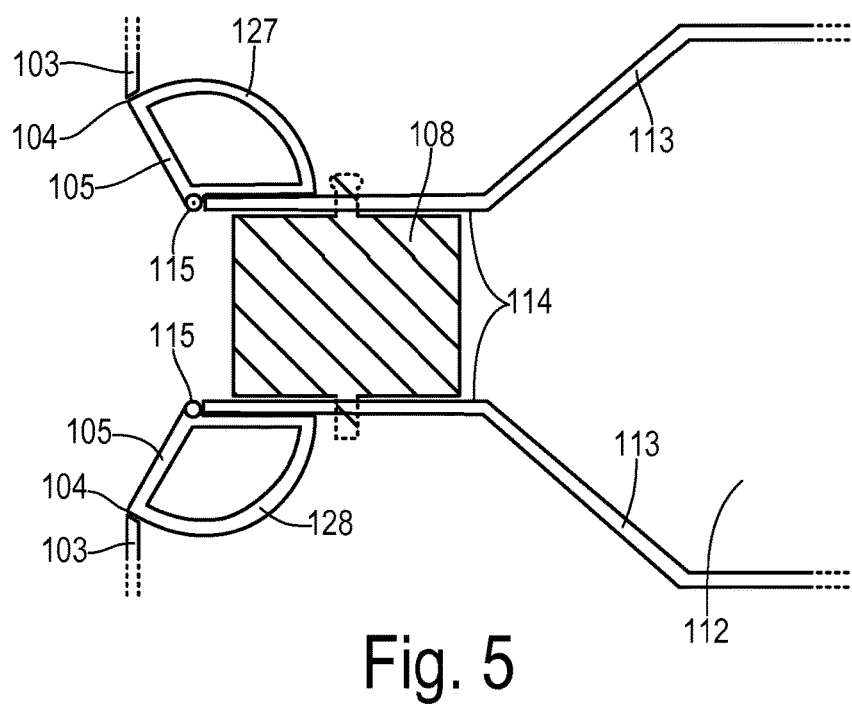
FIG. 5 is a cross-section image of a fully open register showing the interior cover housing, vanes, and duct.
Figure 6:
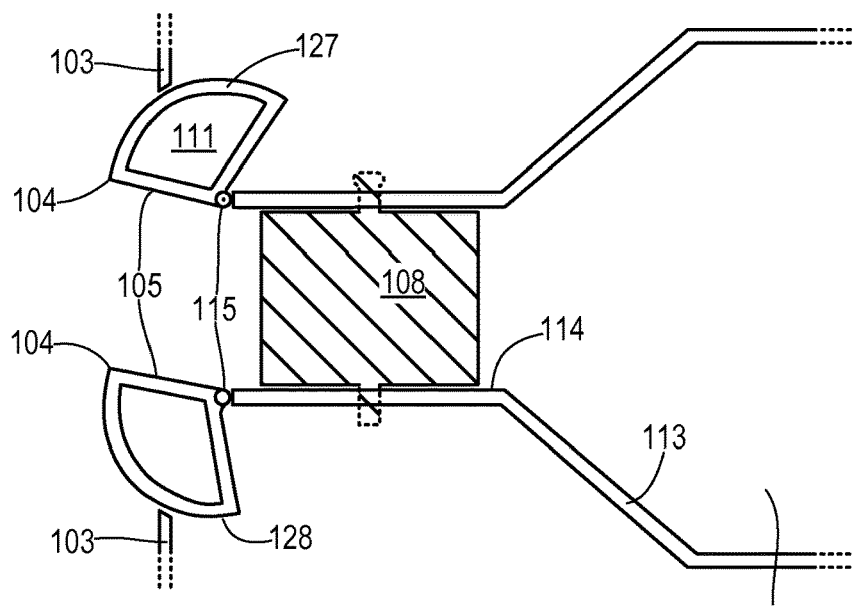
FIG. 6 is a cross-section image of a partly open register showing the interior cover housing, vanes, and duct.
Figure 7:
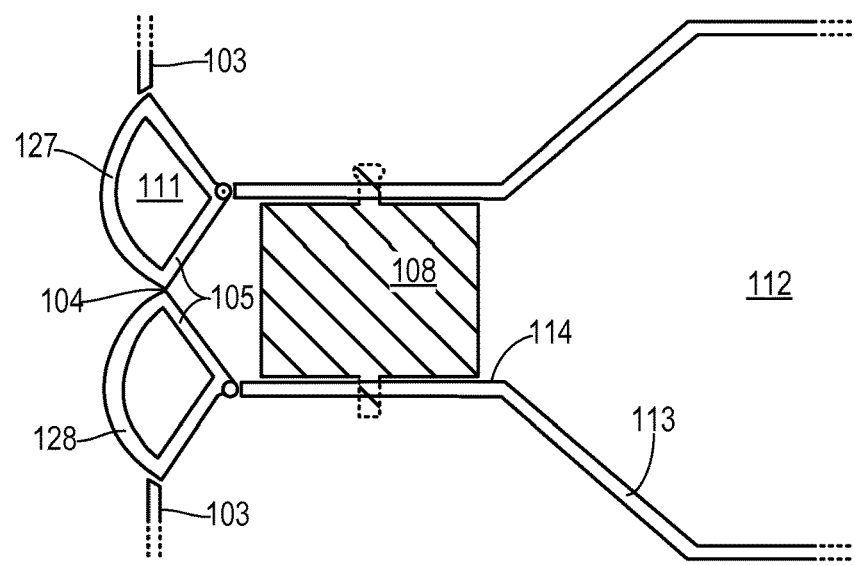
FIG. 7 is a cross-section image of a closed register showing the interior cover housing, vanes, and duct.

In the embodiment shown in FIGS. 5-7, the air flows from the duct 112 and past a restrictor 113 where the width of the duct 112 is reduced and the length broadens to maintain a roughly equivalent flow-path cross-section area. In some embodiments, the duct 112 does not narrow from the duct wall 114 to the register opening and the duct wall 114 is collinear with the wall of the restrictor 113. The air then flows past the vanes 108. As it enters the vehicle interior, the air flow is bounded and directed by a cover partition 105 surface of a first cover door 127 and a second cover door 128 on either side. The open surface panel 103 adjacent the register opening may further direct airflow. The long narrow opening, without traditional longitudinal vanes, provides high efficiency air flow with low turbulence.

Each cover door 127, 128 pivots around its axis 115. Each cover door 127, 128 has a leading edge 104. As the door rotates about the pivot-axis 115, the leading edge moves between a position adjacent or contacting the opposite cover door leading edge 104 and a position adjacent a surrounding panel 103 or another part of the vehicle interior 101. The axis 115 also defines the forward-most edge, nearest the vehicle interior 101, of a wall 114 that separates the air flow path from a compartment 111. The compartment 111 houses the cover door 127, 128 when the door is open and may also house a linear actuator such as the rack 109 and pinion 110 pictured in FIG. 4. The compartment 111 may be defined on one side by a third of a circle, a 120 degree arc, described by the rotational path of one or both of the cover doors 127, 128. This arc ensures that the cover housing area is sufficiently large to accommodate the cover door 127, 128. The compartment 111 is also defined by the cover partition 105 which connects one end of the arc of the semi-cylindrical cover door 127, 128 to the pivot point 115. The partition 105 faces and blocks the air flow path when the cover doors 127, 128 are closed. When one of the cover doors 127, 128 is open, or partly open, the cover partition 105 provides a surface for directing air flow.

Figure 8:
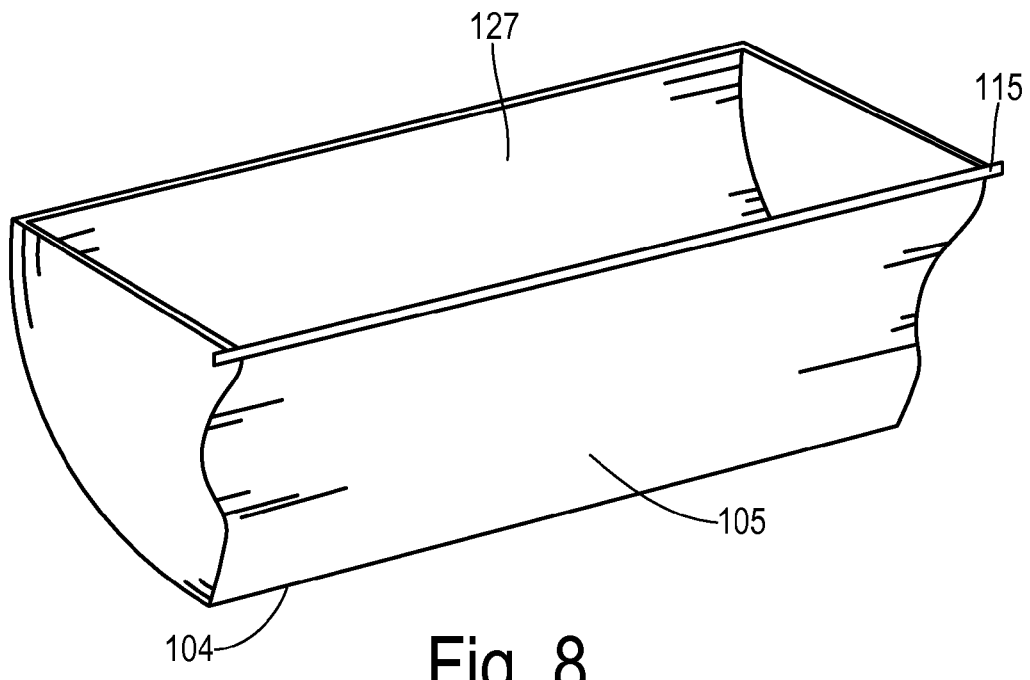
FIG. 8 is an image of an alternate embodiment of the cover with a curved partition.

The partition 105 may be flat, as shown in FIG. 5. It may also be curved. One example of a curved partition 105 is shown in the embodiment seen in FIG. 8. At opposite ends of the partition 105, wedge-shaped pieces connect the edge of the arc surface to the partition, with the tip of the wedge at the pivot point 115. FIG. 8 shows a cover door 127 with a curved partition 105 surface.

In some embodiments, each cover is formed by a single piece of material. In some embodiments, each cover on the register has the same shape. In some embodiments, one cover door on the register has a different shape than the opposite cover door on the register. In one embodiment with different shaped covers, only the partition is substantially different. In another embodiment with different shaped covers, one cover door describes a larger arc and has corresponding larger size and greater depth than the other door on the register. In a further embodiment with different shaped covers, the length of a first cover door is longer than a second cover door on the register, and the leading edge of the longer door, in the closed position, meets the leading edge of the shorter door and also meets a portion of paneling.

The vane shape and placement may be adjusted to accommodate partition 105 curvature or duct 112 shape. If the partition 105 has substantial curvature, the vanes 108 may be placed closer to the duct 112. The actuation mechanism for the vanes 108 may be off-center from the centerline of the vanes 108. Additionally, a linear actuator, or other control mechanism can be placed behind a panel 103, rather than in the compartment 111, to accommodate partition 105 curvature.

Air flows from a blower (not pictured), through ducts 112, past the vanes 108, and into the vehicle interior. Placement and shaping of one or more panels 103 adjacent the air flow path into the vehicle interior 101 provides direction of the air flow by the Coanda effect. Similarly, the shape of the partition 105 provides an additional surface for directing airflow and utilizing the Coanda effect.

Figure 9:
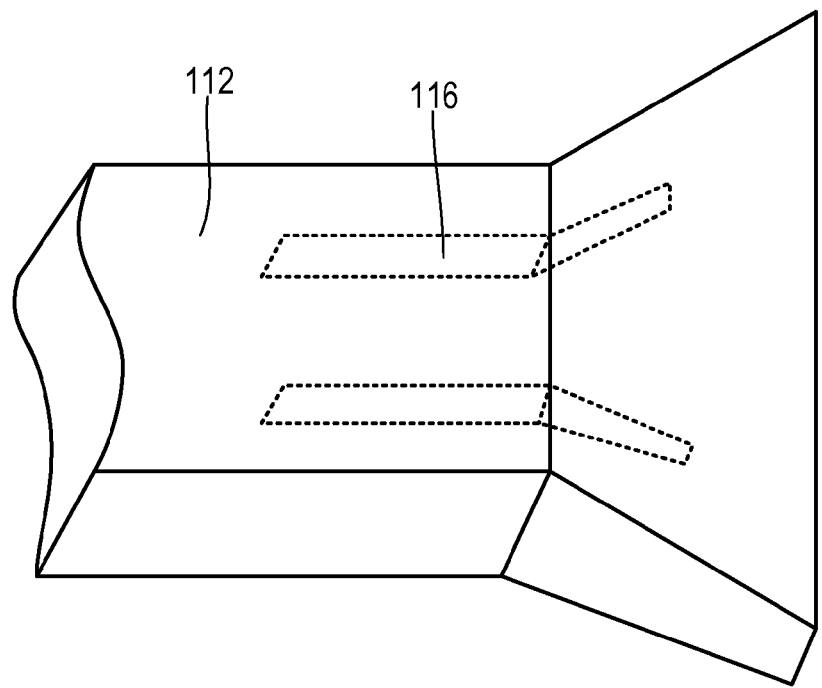
FIG. 9 is an image of a duct with splitters.

FIG. 9 shows a segment of the duct 112 adjacent the register 100. The duct 112 has a set of fins 116 functioning as a diffuser or splitter to direct airflow to more evenly flow through the register 100.

Figure 10:
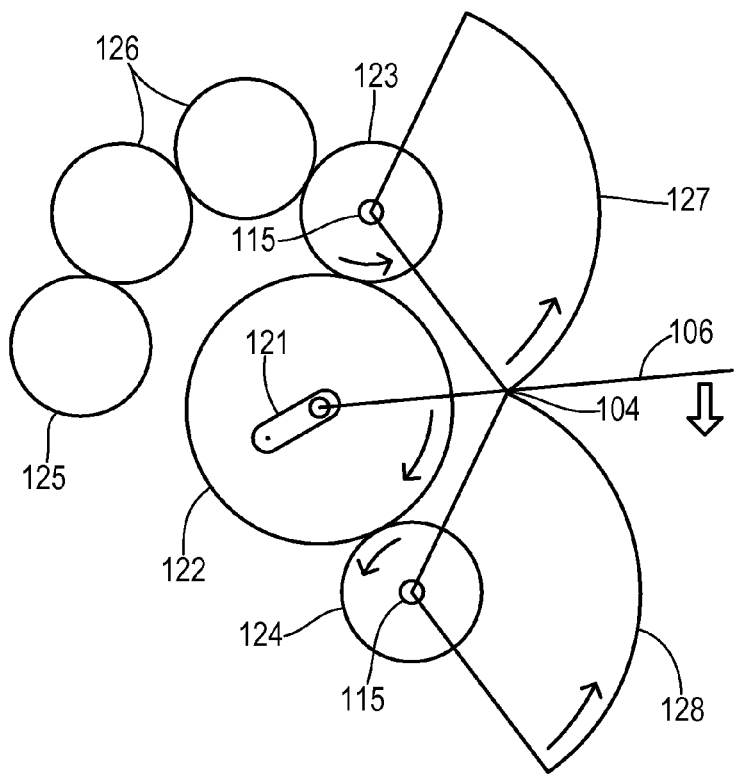
FIG. 10 is a cross-section image depicting gear movement in an exemplary rotary cover door control mechanism.
Figure 11:
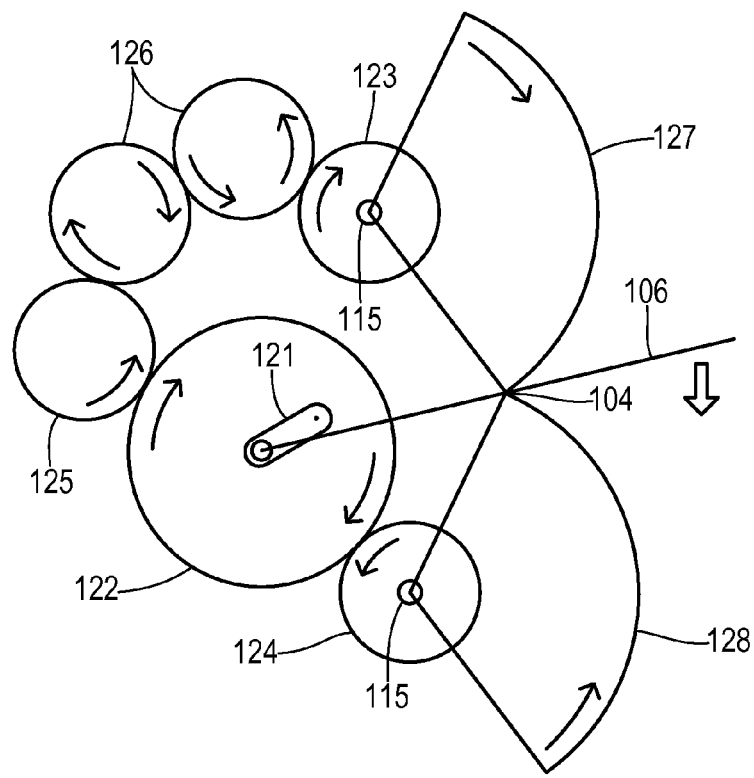
FIG. 11 is another view of gear movement in the rotary cover door control mechanism.

FIG. 10 and FIG. 11 show a simplified representation of a system for controlling the rotary cover doors 127, 128. Shown is a cross-section image depicting gear movement in an exemplary rotary cover door control mechanism. In the embodiment represented, the cover doors 127, 128 are controlled by gears and the gear pitch circles are shown. The gears are moved by a cover control knob 106. The cover control knob 106 is rod-like with a knob at the user interface end and a worm thread or toothed gear at, or fixed to, the gear-engaging end. Pulling or pushing the knob selects which gears are engaged by meshing the teeth or thread of the controller with the teeth of one or more gears. Moving the knob linearly provides a force to turn one or more engaging gears. Multiple gears can be used to transmit the force or to change the directional of the force. Moving the knob turns one or more gears which rotate the cover door around a pivot axis.

FIG. 10 shows a driving gear 122 engaging a first door pivot gear 123 and a second door pivot gear 124. The first door pivot gear 123 and second door pivot gear 124 are axially connected to the pivot axis 115 of the respective cover doors 127, 128. As shown by the movement-indicating arrows, a downward movement of the cover control 106 rotates the driving gear 122 which is engaged with both the first door pivot gear 123 and second door pivot gear 124. The downward motion is transferred through the gears to simultaneous coordinated upward rotary motion of both covers 127, 128. An upward motion of the control 106 would produce the opposite effect of a downward rotary force for both covers 127, 128.

FIG. 11 shows a driving gear 122 engaging the second door pivot gear 124 and a driven gear 125. To switch between the configuration shown in FIG. 10 and the configuration of FIG. 11, the cover control 106 is pushed inwardly by the user. A gear engagement guide 121 aligns the driving gear 122 to be engaged with one of the first door pivot gear 123 or the driven gear 125, but not both simultaneously. The gear engagement guide 121 may be integrated into a gear enclosure 118 as shown in FIG. 4. As shown by the movement-indicating arrows, in the configuration of FIG. 11, a downward movement of the cover control 106 rotates the driving gear 122 which is engaged with both the driven gear 125 of a gear train and the second door pivot gear 124. The downward motion is transferred through the idler gears 126 to produce simultaneous coordinated opposite rotary motion of both covers 127, 128 towards a closed position. An upward motion of the control 106 would produce the opposite effect of a downward rotary force for both covers 127, 128 towards an open position.

In some embodiments, the driving gear may be positioned to selectively engage the first door pivot gear 123 or the second door pivot gear 124 separately, so as to entrain the movement of only the first cover door 127 or the second cover door 128 independently of the other. In some embodiments, gear engagement guide 121 may be shaped to selectively engage one or both of the first door pivot gear 123 and the second door pivot gear 124 to permit both coordinated and independent movement of the cover doors 127, 128.

In some embodiments, a cover door control mechanism comprises a first door pivot gear configured to rotate the first door between the open and closed positions; a second door pivot gear configured to rotate the second door between the open and closed positions; a driven gear configured to rotate the first door pivot gear; and a driving gear, fixedly connected to a cover control knob, and having a first engaging position and a second engaging position, whereby the first engaging position is configured to transfer movement of the cover control knob to rotate the first and second door pivot gears in the same direction, and whereby the second engaging position is configured to transfer movement of the cover control knob to rotate the first and second door pivot gears in the opposite direction.

In some embodiments, a gear train may be actuated by a driving gear. The driving gear is associated with the cover control knob. In some cases, the driving gear may be directly attached to the control knob. In an embodiment, the driving gear may be axially connected to the control knob at the driving gear axis. The number, size, type, and placement of gears may be adjusted for specific design parameters.

In another embodiment the cover door knob or controller is twisted to engage a worm gear with a bevel gear and other gears in a gear train. In an alternate embodiment, a crossed belt pulley system is used. In a further embodiment a motor controls the cover door.

In another embodiment the cover door positions and vane positions are controlled by a digital interface. In an embodiment the air flow magnitude and direction is automated.

In an embodiment, the doors move in a coordinated manner in the same or opposite rotational direction. In an embodiment, the doors move cooperatively and to the same degree relative to each other.

In an embodiment, a method for directing airflow into a vehicle passenger compartment comprises, providing a vehicle air register system having: an airflow path from a blower to a duct, through an opening from the duct to a vehicle interior, the opening having length and width, wherein the length is greater than the width; a first door, movably mounted at a first side of the opening, rotatable around a first lengthwise pivot-axis between closed and open, wherein the closed first door covers at least one-half the opening; and a second door, movably mounted at an opposite side of the opening, parallel to the first side, rotatable around a second lengthwise pivot-axis between closed and open; rotating the first door to a selected position; and rotating the second door to a selected position, thereby directing airflow into the vehicle passenger compartment.

In an embodiment, the opening length is at least three times the width. In an embodiment, the opening length is at least four times the width. In an embodiment, the opening length is 3 to 5 times the width. In an embodiment, the opening width is less than half of a width of the duct.

In particular non-limiting examples of installations and embodiments, the register may be formed of aluminum, plastic, metal alloys, composites, chrome plated plastics, nickel plated composites, or other stiff materials. The structure may be adapted by means known in the art, such as with the use of gaskets, brackets, cams, diffusers, and the like. The cover doors, at the junction where the two doors meet, may include a lip, a mating groove and ridge, or a compliant material to aid in sealing the juncture when the doors are fully closed. The surfaces may be adapted with flow indicators, climate control demonstration, pictographs, logos, texturing, and additional features.

The terms and expressions which have been employed are used as terms of description and not of limitation. Whenever a range is given in the specification, all intermediate ranges and subranges, as well as all individual values included in the ranges given are intended to be included in the disclosure. It should be understood that, although the present invention has been specifically disclosed by particular embodiments and examples, optional features, modification and variation of the concepts herein disclosed may be used by those skilled in the art, and such modifications and variations are considered to be within the scope of the invention as defined by the appended claims.

What is claimed is:

1. A vehicle air register, comprising: an airflow path through an opening from a duct to a vehicle interior, the opening having length and width; a first door, rotatable between closed and open around a first lengthwise pivot-axis extending along a forward-most side edge of the duct, wherein the closed first door covers at least one-half the opening; and a second door, opposite the first, rotatable around a second lengthwise pivot-axis between closed and open.

2. The register of claim 1, wherein the register has no lateral vanes parallel to the first lengthwise pivot-axis.

3. The register of claim 1, wherein the closed first door is semi-cylindrical on a surface facing the vehicle interior, and wherein the closed second door is semi-cylindrical on a surface facing the vehicle interior, and wherein the closed first and second doors block substantially all airflow through the opening.

4. The register of claim 1, wherein the first door is configured to rotate about 120 degrees between the closed position and the open position, and wherein the second door is configured to rotate about 120 degrees between the closed position and the open position.

5. The register of claim 1, further comprising:
a cover door control mechanism comprising:
a first door pivot gear configured to rotate the first door between the open and closed positions;
a second door pivot gear configured to rotate the second door between the open and closed positions;
a driven gear configured to rotate the first door pivot gear; and
a driving gear, fixedly connected to a cover control knob, and having a first engaging position and a second engaging position, whereby the first engaging position is configured to transfer movement of the cover control knob to rotate the first and second door pivot gears in the same direction, and whereby the second engaging position is configured to transfer movement of the cover control knob to rotate the first and second door pivot gears in the opposite direction.

6. The register of claim 1 further comprising: a plurality of vanes oriented substantially perpendicular to the length of the register.

7. The register of claim 1 further comprising:
a plurality of vanes oriented substantially perpendicular to the length of the register, wherein the vanes are adapted to pivot, thereby directing air flow; and
a vane control, wherein the vane control is configured to pivot the vanes by a linear actuator.

8. The register of claim 1, wherein the opening length is at least four times the width.

9. The register of claim 1, wherein the opening length is 3 to 5 times the width.

10. The register of claim 1, wherein the opening width is less than half of a width of the duct.

11. The register of claim 10, further comprising: at least two splitter fins placed along the airflow path between the duct and the opening.

12. The register of claim 1, wherein each door is formed from a single piece of material.

13. The register of claim 1, wherein the duct has no flow shutter.

14. The register of claim 1, wherein the first door is longer than the second door.

15. The register of claim 1, wherein the length is greater than the width.

16. A method for directing airflow into a vehicle passenger compartment comprising:
providing a vehicle air register system having:
an airflow path from a blower to a duct, through an opening from the duct to a vehicle interior;
a first door, movably mounted at a first side of the opening, rotatable about 120° between closed and open around a first lengthwise pivot-axis extending along the first side of the opening and defining a forward-most edge of the duct, wherein the closed first door covers at least one-half the opening; and
a second door, movably mounted at an opposite side of the opening, parallel to the first side, rotatable about 120° around a second lengthwise pivot-axis between closed and open;
rotating the first door and second doors to a selected position, thereby directing airflow into the vehicle passenger compartment.

17. The method of claim 16, wherein, the system further comprises a cover door control mechanism comprising: a first door pivot gear configured to rotate the first door between the open and closed positions; a second door pivot gear configured to rotate the second door between the open and closed positions; a driven gear configured to rotate the first door pivot gear; and a driving gear, fixedly connected to a cover control knob, and having a first engaging position and a second engaging position, whereby the first engaging position is configured to transfer movement of the cover control knob to rotate the first and second door pivot gears in the same direction, and whereby the second engaging position is configured to transfer movement of the cover control knob to rotate the first and second door pivot gears in the opposite direction, the method further comprising:
moving the cover control knob to the second engaging position; and
rotating the gears to close the covers and substantially block all airflow through the opening.

18. A control mechanism for an air vent cover comprising:
a first door pivot gear configured to rotate a first door between an open and a closed position;
a second door pivot gear configured to rotate a second door between an open and a closed position;
a driven gear configured to rotate the first door pivot gear; and
a driving gear, fixedly connected to a cover control knob, and having a first engaging position and a second engaging position, whereby the first engaging position is configured to transfer movement of the cover control knob to rotate the first and second door pivot gears in the same direction, and whereby the second engaging position is configured to transfer movement of the cover control knob to rotate the first and second door pivot gears in the opposite direction.

19. The control mechanism of claim 18, further comprising one or more idler gears configured to transfer movement from the driven gear to the first door pivot gear.

20. The control mechanism of claim 18, wherein the first door and the second door move cooperatively and to the same degree relative to each other.

* * * * *